United States Patent [19]

Sharp et al.

[11] 4,420,009

[45] Dec. 13, 1983

[54] APPARATUS FOR MIXING FLUIDS

[75] Inventors: Derek J. Sharp; Robert C. Watts, both of Sutton, England

[73] Assignee: BOC Limited, London, England

[21] Appl. No.: 310,934

[22] Filed: Oct. 13, 1981

Related U.S. Application Data

[63] Continuation of Ser. No. 137,099, Apr. 4, 1980, abandoned.

[30] Foreign Application Priority Data

Apr. 6, 1979 [GB] United Kingdom ............... 7912269

[51] Int. Cl.³ .................. G05D 11/03; F15D 1/00
[52] U.S. Cl. ..................... 137/98; 137/599; 138/44
[58] Field of Search .............. 137/7, 87, 98, 100, 137/114, 599, 606, 607; 138/44, 45

[56] References Cited

U.S. PATENT DOCUMENTS

| 2,589,373 | 3/1952 | Hammock | 137/599 |
|---|---|---|---|
| 2,672,159 | 3/1954 | Walton | 138/44 |
| 2,687,147 | 8/1954 | Feichter | 138/44 |
| 3,062,410 | 11/1962 | Schwieger | 137/599 X |
| 3,403,006 | 9/1968 | Hersch | 138/44 X |
| 3,404,702 | 10/1968 | Telford | 137/100 |
| 3,726,296 | 4/1973 | Friedland et al. | 137/599 X |
| 3,762,427 | 10/1973 | Mollering | 137/100 X |
| 3,820,571 | 6/1974 | Grier | 138/44 |
| 3,830,256 | 8/1974 | Cox | 137/599 |
| 3,875,964 | 4/1975 | Friedland | 137/599 |
| 3,886,971 | 6/1975 | Lundsgaard | 137/599 |
| 3,942,553 | 3/1976 | Gallatin | 137/599 |
| 4,148,340 | 4/1979 | Hutton | 137/599 |
| 4,248,263 | 2/1981 | Langill et al. | 137/599 X |

Primary Examiner—Martin P. Schwadron
Assistant Examiner—R. Nilson
Attorney, Agent, or Firm—David L. Rae; Larry R. Cassett

[57] ABSTRACT

A fluid-flow restricting apparatus for mixing fluids employs a body member housing elongate flow restrictors (typically capillary tubes) which restrict the flow of the fluid therethrough. Demountable fluid-tight seals are provided between the capillary tubes and passages in the body in which the tubes are housed. An inlet header is demountably attached to the body so as to distribute fluid to the capillary tubes. There is a common outlet passage communicating with the outlet ends of the capillary tubes. The inlet header may be fed with the fluids to be mixed from a pressure regulation system and has several inlets. Valves are operable to select which header inlets are placed in communication with the respective fluids to be mixed.

12 Claims, 7 Drawing Figures

APPARATUS FOR MIXING FLUIDS

This is a continuation, of application Ser. No. 137,099, filed Apr. 4, 1980, now abandoned.

BACKGROUND OF THE INVENTION

This invention relates to apparatus for mixing fluids.

In, for example, the calibration of analytical instruments it is conventional to employ accurately preformed gas mixtures supplied under pressure in suitable containers (ie. gas cylinders). Such mixtures can be formed very accurately by manufacturers of industrial gases using gravimetric methods which require expensive equipment. It is uneconomic for the user of the gas mixture to make his own mixture by the methods employed by manufacturers of industrial gases. Accordingly, attempts have been made to produce for use on-site gas mixers which operate on the principle of passing the component gases through calibrated flow restrictors (or impedances) and forming a mixture whose composition depends on the ratio of the flow rates of the respective gases through the flow impedances. The ability to form gas mixtures accurately by such a technique depends, it has been believed, to a substantial extent on maintaining the gases to be mixed at substantially the same constant pressure upstream of the flow restrictors. To this end, pressure regulators are employed, and the gases to be mixed are typically supplied to the respective regulators at the same pressure. In practice, however, there are difficulties in obtaining a constant output pressure from a conventional regulator if there is a varying downstream flow resistances and thus special arrangements need to be adopted in order to solve this problem. (See for example U.S. Pat Nos. 3,493,005 and 3,762,427).

Another problem associated with the kind of gas mixer described above is the choice of flow resistor. It is possible to provide a series of orifice places with different sized orifices, or a series of needle valves of different dimensions from one another. However, it can be relatively expensive to make such flow resistors, and, moreover, considerable problems arise should one such flow resistor become clogged with a piece of solid material. One commercial gas mixer employs a number of stainless steel capillary tubes which are brazed or welded into a suitable holder. (The gas flow meter described in U.S. Pat. No. 3,487,688 shows a similar arrangement of capillary tubes.) Should one such capillary become blocked, replacement of it is a time-consuming operation involving breaking of the welded or brazed join which holds the defective capillary into the holder, and then the making of a new join.

Problems that arise in the design and construction of gas mixers have been described above. Analogous problems arise in the mixing of liquids.

It is an object of the present invention to provide, for use in a fluid mixer, flow restricting apparatus which may readily be kept in good working order. It is a further object of the present invention to provide relatively compact flow restricting apparatus of relatively simple construction for use in the fluid mixer.

It is a yet further object of the present invention to provide a fluid mixer including flow restricting apparatus that is relatively compact and of relatively simple construction, and that is readily demountable to enable individual flow restrictor elements to be replaced if needs be.

GENERAL DESCRIPTION OF THE INVENTION

According to the present invention there is provided, for mixing fluids, a fluid-flow restricting apparatus comprising a solid body having passages therethrough, which passages house elongate tubular flow restrictors; means for forming demountable fluid-tight seals between the restrictors and the passages; an inlet header for distributing flid to the flow restrictors and an outlet passage communicating with the outlet ends of the flow restrictors, the inlet header being demountably attached to the body.

The elongate flow restrictors are preferably capillary tubes. The capillary tubes are preferably of glass. The use of glass capillary tubes offers a number of advantages. First, these tubes are readily available with precise bores. Second, they are resistant to chemical attack by most fluids. Third, they may be cut to length without distoring the shape of their inlets and outlets. Fourth, assuming that the chosen length is sufficient in relation to the diameter of the bore, absolute accuracy in cutting them to length is not required (eg. 1 mm in 5 cm will be a tolerable error for fine bore capillary tubes). Fifth, the use of capillary tubes facilitates the formation of demountable seals between them and the passages in the body. In addition, the use of glass enables the bore to be inspected visually, and thus enables the presence of, for example, specks of dirt to be detected. If capillary tubes are not employed as flow restrictors, then the internal wall thickness of the tubes that are employed is preferably large compared with their internal diameter.

The body is preferably made of material having a low thermal conductivity. A filled polytetrafluoroethylene is a suitable choice as such material is chemically inert to most fluids, has a low thermal conductivity, and is easy to machine or drill. Conveniently, the body is of cylindrical form.

Preferably, each tube carries, typically at its inlet end, an O-ring seal of elastomeric material which grips the outer wall of the tube and on compression makes a seal with the passage (typically its mouth) in which it is housed. The required compressive force may be applied by a plate which is clamped or bolted to the body. Alternatively, each passage may engage a nut which applies a compressive force to the O-ring seal carried by the restrictor housed in that passage.

The passages are preferably axial with respect to the body. The inlet header typically has at least three fluid inlets but they may be just two such inlets. Each fluid inlet preferably communicates with a different number of tubes from the others. (Typically, all the tubes will have the same dimension). Thus, the composition of the mixture will depend on which fluid inlets are placed in communication with the respective fluids to be mixed.

Typically, the inlet header comprises a cap of the same material as the body, fluid inlets through the cap, and a gasket having apertures therethrough which places each inlet in communication with different flow restrictors. Typically, the clamps or bolts used to hold the sealing plate in position are also used to hold the cap and gasket adjacent the sealing plate.

There may be a demountable outlet heater which is typically of the same material of the body, which may be clamped or bolted thereto, and in which the outlet passage is situated. In such an embodiment of the invention, the axis of the outlet passage may be parallel to those of the passages in the body. Thus, the whole assembly may for example take the form of a cylindrical unit. This unit may be of relatively small size compared with known commercial units.

In an alternative embodiment of the invention, the outlet passage extends transversely to the passages in the said body. Such an arrangement makes it possible for the body to be particularly compact.

The fluid-flow restricting apparatus according to the invention will typically form part of a fluid mixing apparatus additionally including inlet passages for the fluids to be mixed; means for regulating the pressure at which each fluid is supplied to the elongate flow restrictors; and valve means operable to place each inlet passage in communication with selected flow restrictors.

Preferably, there is a pressure regulator in each inlet passage and means for applying, in use of the apparatus, the output pressure of one pressure regulator to the valve member of the other (or another) pressure regulator in a valve-opening direction, thereby a change in the output pressure of the one regulator produces a complementary change in the output pressure of the other regulator.

A typical pressure regulator includes a passageway for fluid flow, a valve member, a chamber separate from the passageway, and in the chamber a spring which biases the valve member in a passageway-opening direction. A flexible member such as a diaphragm typically constitutes a common wall between the biasing chamber and the passageway downstream of the valve member. Instead of a diaphragm, a bellows or a spring-loaded piston may be employed to define such a common wall. Such a pressure regulator may readily be adapted for use in the fluid mixig apparatus according to the invention. This can be done simply by drilling or otherwise forming a hole or passage from an external surface of the housing of the regulator into the chamber (if no such passage is already available) and then making an appropriate fluid connection between the output side of another (or the other) regulator and the chamber. The fluid pressure may, in the example of mixing gases, either supplement or replace the spring pressure. Typically, it will be desirable to remove the spring. Since the chamber is separate from the passageway, fluid applied from the output of one regulator does not mix with the fluid flowing through the other regulator in that other regulator.

In the example of mixing two fluids, there are typically two inlet passages and hence two pressure regulators. For ease of reference the pressure regulator whose outlet pressure is applied to the valve member of the other regulator will be referred to as the first regulator, and the regulator to the valve member of which the outlet pressure of the first regulator is applied will be referred to as the second regulator. Although it is possible for the first regulator to be of conventional construction so far as biasing of its valve member is concerned (and indeed for this regulator to be provided on a gas cylinder head, if a gas cylinder is the source of one of the gases to be mixed), it is preferred that there is means for applying to the valve member of the first regulator in a valve-opening direction the fluid pressure upstream of the second regulator. This arrangement offers the advantage that precise setting of the pressures at which the fluids are supplied to the inlet passages is rendered unnecessary. An explanation of the reason why it is possible to achieve this advantage and the reason why a change in the output pressure of the first regulator produces a complementary change in the output pressure of the second regulator shall be given in the description below with reference to the drawings. In an alternative arrangement there is a regulator in one of the inlet passages, and the gas pressure in the other inlet passage immediately downstream of a gas cylinder is applied to the valve member of the regulator in a valve-opening direction.

The invention is not restricted to the mixing of two liquids or the mixing of two gases. Suppose it is desired to mix four liquids or four gases. Typically, four inlet passages are provided with a pressure regulator in each passage. The output of a first pressure regulator may be applied in a valve-opening direction to the valve member of a second regulator; the output pressure of the second regulator to the valve member of a third regulator in a valve-opening direction; the output pressure of the third regulator to the valve member of a fourth regulator in a valve-opening direction, and the pressure on the inlet side of the fourth regulator applied to the valve-member of the first in a valve-opening direction.

The valves may be manually operable or may operate automatically. Solenoid-actuated valves may for example be used. In a typical arrangement for mixing two different fluids, a system of valves may be capable of placing both inlet passages in communication with anyone or or any combination of, say, four header inlets of the flow restricting apparatus according to the invention. A first header inlet may communicate with one tubular restrictor of unit flow impedance, a second header inlet with two such restrictors; a third header inlet with three such restrictors, and the fourth header inlet with four such restrictors. Thus, it is possible to form a two-component mixture in which the proportion of either component may be varied in steps of 10% by volume from 0 to 100% by volume. It is also possible to achieve smaller gradations in the composition of mixtures produced by apparatus according to the invention by employing more than 10 flow restrictor tubes in a single flow restrictor unit.

Depending on the respective viscosities of the fluids to be mixed, and the range of mixtures of such fluids that are to be produced, it may be desirable to take account of the difference in viscosities between the fluids. Thus, for example, if there are two fluids, certain flow restrictor tubes may be allocated by operation of suitable valve means to one fluid, and the remaining flow restrictor tubes allocated to the other fluid, the respective lengths of the flow restrictor tubes being chosen as to compensate for a difference in viscosity between the two fluids. A more elegant way of achieving the same end is to arrange for the output pressure of one regulator to be greater than the output pressure of the other regulator by an amount which compensates for the difference in viscosity between the two fluids. Thus the biasing pressure acting on the valve member of the second regulator may then be the output pressure of the first regulator plus a spring (or other mechanical biasing) pressure of chosen magnitude, the spring pressure being selected so as to compensate for the difference in viscosity between the two fluids.

Preferably a back-pressure regulator is in communication with the common outlet in order to maintain an appreciable pressure drop across the mixer. If desired, there may be a needle valve in communication with the common outlet of the gas mixing apparatus downstream of the back-pressure regulator.

BRIEF DESCRIPTION OF THE DRAWINGS

Gas mixing apparatus according to the invention will now be described by way of example with reference to the accompanying drawings of which.

DESCRIPTION OF PREFERRED EMBODIMENTS

Figure 1:
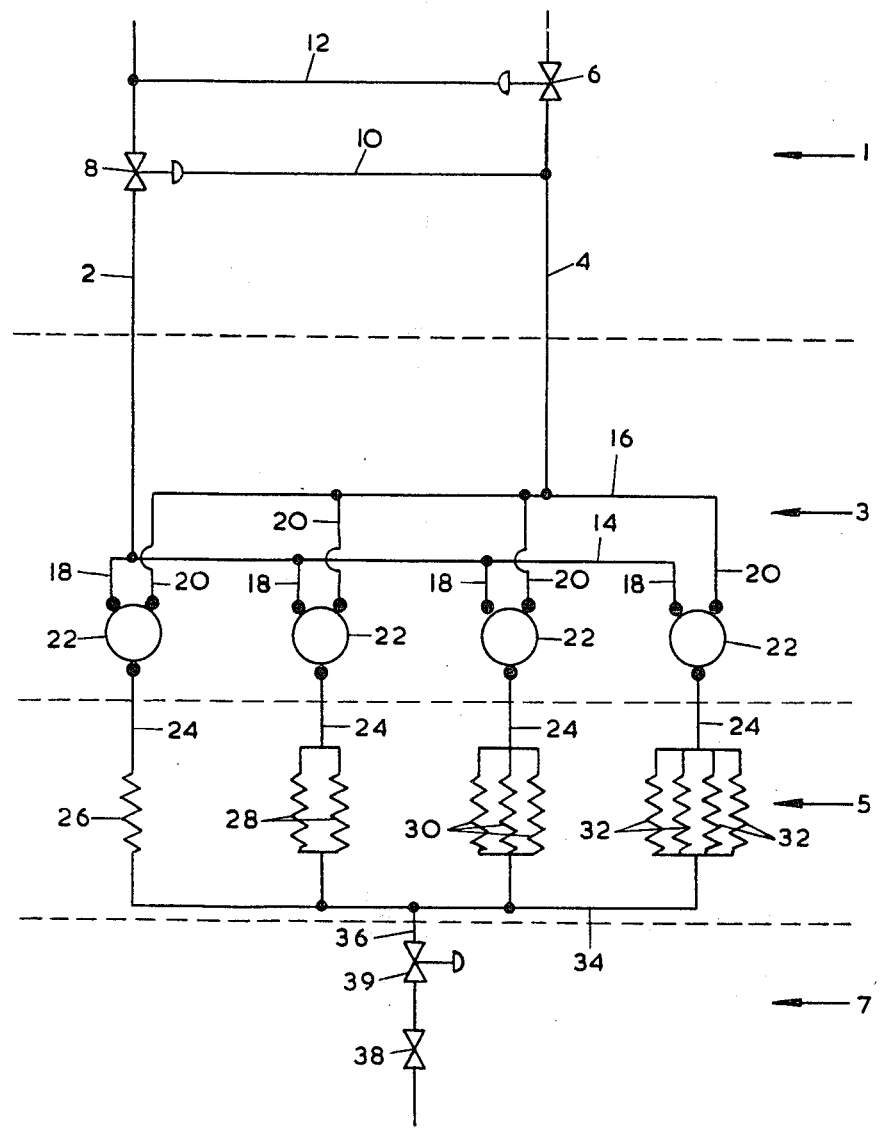
FIG. 1 is a schematic flow diagram illustrating gas mixing apparatus according to the invention.

The gas mixing apparatus shown in FIG. 1 can be viewed as consisting of four parts: A pressure regulating system 1 for producing flows of two gases at substantially the same pressure; a network 5 of flow restrictors or flow impedances; a system 3 of valves for dividing the flow of the two gases among selected flow impedances, and a common output 7 from which the gas mixture can be taken. The network of flow restrictors (or flow impedances) is provided either by the apparatus shown in FIGS. 4 to 6 of the accompanying drawings, or by that shown in FIG. 7 of the accompanying drawings.

The pressure regulation unit 1 will be described first.

There are two inlet passages 2 and 4. The inlet passage 2 is connectible to a source of a first gas (for example, a gas cylinder) and the inlet passage 4 is connectible to a source of a second gas (for example, a cylinder). In the inlet passage 4 is a first pressure regulator 6. In the inlet passage 2, is a second pressure regulator 8.

Figure 2:
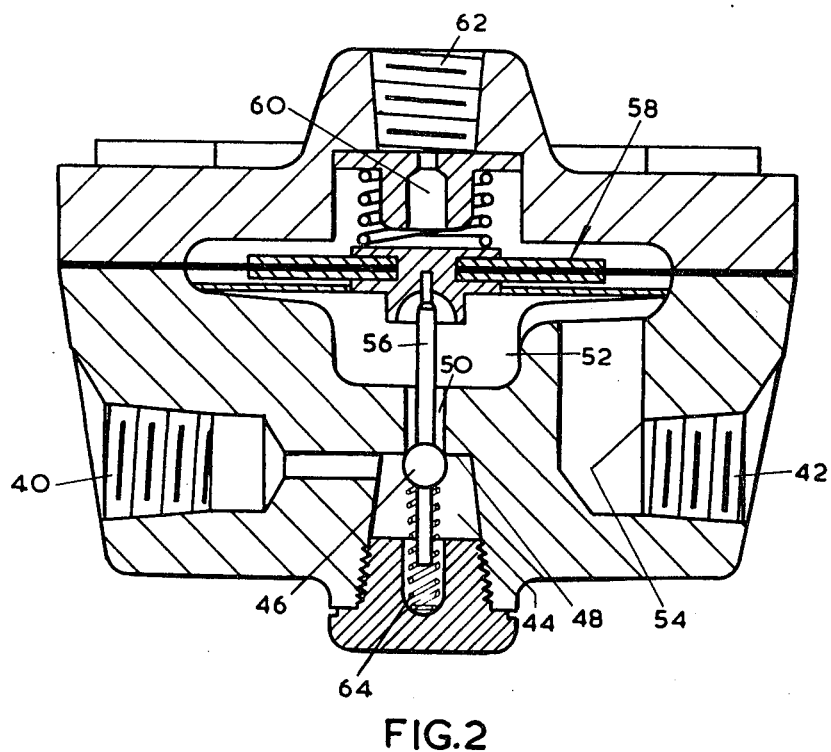
FIG. 2 is a sectional elevation of a pressure regulator suitable for use in the apparatus shown in FIG. 1.

The construction of the regulators is illustrated in FIG. 2. Each regulator has a gas inlet 40 and a gas outlet 42. The inlet 40 communicates with a valve chamber 44 in which is disposed a valve member 46 and a valve seat 48. The valve chamber 44 communicates via a passageway 50 with a plenum chamber 52 whose outlet 54 is in communication with the outlet 42. The valve member 46 is mounted on a spindle 56 which extends through the passageway 50. One end of the spindle 56 terminates in the valve chamber 44, the other end in the plenum chamber 52, that end being fixed to a flexible diaphragm assembly 58 which forms a common wall between the plenum chamber 52 and a biasing chamber 60. A gas pressure may be applied through an inlet 62 to the biasing chamber 60 to cause the diaphragm assembly 58 to flex in the direction of the valve chamber 44 and thereby move the valve member 46 away from its seat 48. This action may be resisted by the bias of a spring 64 whose rating may be chosen to be equivalent to that of the diaphragm. Thus, the pressure of the gas at the outlet 42 depends on the gas pressure applied to the inlet 62. Is is to be appreciated that the gas applied to the inlet 62 cannot mix in the regulator with a gas passing from the inlet 40 to the outlet 42.

In operation, gas at a chosen pressure may be applied to the inlet 62 so as to move the valve member 46 away from its seat 48 a suitable distance equivalent to a desired outlet pressure. Gas at a chosen pressure entering the upstream side of the regulator through the inlet 40 thus flows into the valve chamber 44 through the passageway 50 and into the plenum chamber 52. From there, it flows through the outlet 42 at a pressure determined by the pressure applied to the inlet 62. Should the flow resistance downstream of the outlet 42 be increased, there will be a tendency for the gas to flow more slowly out of the outlet 42. Consequently, the pressure in the plenum chamber 52 will tend to increase. This pressure acts on the diaphragm assembly 58 in a valve closing direction and thereby tends to move the valve member 46 closer to the seat 48 reducing the rate of flow of gas into the plenum chamber 52. Thus, any increase in the pressure of gas at the outlet 42 tends automatically to be compensated for. Analogously, should the resistance to flow of gas downstream of the outlet 42 be decreased, with a result that gas tends to flow out of the outlet 42 at an increased rate and the pressure in the plenum chamber 52 drops, the resistance to flexure of the diaphragm assembly 58 will be reduced and consequently, the gas pressure applied to the biasing chamber 62 will move the valve member 46 further away from its seat 48. This will increase the rate of flow of gas from the inlet 40 into the plenum chamber 52 and thus compensate for the decrease in pressure caused by the decrease in flow resistance downstream of the outlet 42.

Alternative constructions of pressure regulator are possible. For example, the biasing chamber may have or be defined by a bellows whose closed end defines a common wall between the biasing chamber and the plenum chamber. Alternatively, the common wall between the plenum chamber and the biasing chamber may be provided by the head of a spring-loaded piston. All such constructions have the common feature that, in operation, the volume of the plenum chamber is changed in the compensatory manner described above with reference to FIG. 2.

Figure 3:
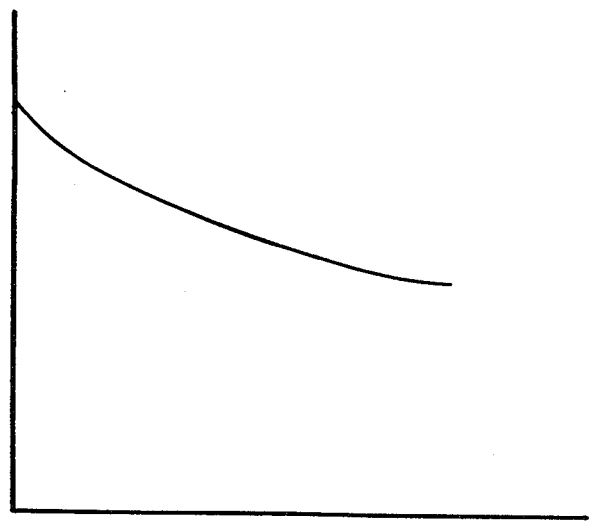
FIG. 3 is a graph illustrating qualitatively how the pressure output of the regulator shown in FIG. 1 varies with pressure.

It will thus be appreciated that if the upstream pressure is substantially constant, a substantially constant downstream pressure should be produced irrespective of the precise flow rate of gas through the outlet 42. In practice, however, the internal compensation for downstream changes in flow resistance cannot keep the output pressure at the outlet 42 exactly constant. The nature of the deviation from this ideal condition is shown in FIG. 3. It will be seen that as the flow rate increases from, say, 0 to 10 liters per minute, so the output pressure decreases. Typically, a pressure drop from a flow rate of 0 liters per minute to a flow rate of 10 liters per minute may be in the order of 5 to 10% of the pressure at 0 liters per minute.

It is to be appreciated that if two such regulators are used without being "inter-linked" in the manner required by the present invention, selecting a larger flow resistance downstream of one regulator (hence a smaller flow resistance downstream of the other) will cause an increase in the pressure output of one regulator and a decrease in the pressure output of the other regulator, which changes will tend to reinforce one another and thereby give an appreciable difference between the two outputs which will cause the composition of the final mixture to deviate from what is required.

In accordance with the invention, however, (referring again to FIG. 1) the output pressure from the regulator 6 is applied via a passage 10 to the regulator 8 in a valve opening direction (ie. to the biasing chamber 60 as shown in FIG. 2). Assuming that the total flow of gas through the apparatus is 10 liters per minute and the flow resistance downstream of the regulator 6 is reduced so as to increase the flow rate through the regulator 6 from, say, 5 liters per minute to 7 liters per minute, then, since the flow rate out of the apparatus must equal the flow rate into it, the flow rate through the regulator 8 will be reduced from 5 liters per minute to 3 liters per minute. Normally, such a change would be associated with an increase in the output pressure of the regulator 8 (if the pressure in the biasing chamber 60 as shown in FIG. 2 remains constant). However, in accordance with the invention, this biasing pressure does not remain constant. As the flow rate through the regulator 6 is increased and its output pressure deceases, so the biasing pressure acting on the valve member of the regulator 8 in a valve opening direction is reduced, as this pressure is substantially equal to the output pressure of the regulator 6. In practice, it has been found that a change in the flow rates through both the passages 2 and 4 of the kind indicated above will cause the output pressure of both regulators to drop. Similarly, if the flow resistance downstream of the regulator 6 is increased, the output pressure of both regulators will increase. What is important is that the compensatory change in the output pressure of the regulator 8 is substantially the same as the change in pressure that takes place in the output pressure of the regulator 6. Thus, although the absolute values of these pressures do change, their relative values change little. We have found, that at a pressure of 15 psig and a total flow rate of 4 liters per minute the relative pressure drop throughout the possible range of gas mixture that can be created is less than 1% of the absolute pressure.

In accordance with a preferred feature of the present invention, the pressure upstream of the regulator 8 is applied by means of a conduit 12 in a valve opening direction to the regulator 6. Thus, the output pressure of the regulator 6 depends on the input pressure to the regulator 8. The advantage of this arrangement is that it reduces the criticality of the input pressures to the regulators and enables the gas mixing apparatus to be set up within a wide range of operating pressures (and it is possible to change the input pressures during operation) without effecting the equivalence of the output pressures. Only the total output pressure and total output flow rate in the output section 7 would be affected. For example, the input pressure to the passage 4 may be set at 30 psig. The gas may be introduced into the passage 2 at a lower pressure which may be selected manually to obtain the desired output pressure and flow rate from this section or unit 7 according to the invention.

The flow resistance unit 5 will now be described.

With reference to FIG. 1, the flow resistance unit 5 has four inlets each indicated by a reference 24. The extreme left-hand inlet 24 (as shown in FIG. 1) communicates with a single flow resistor tube 26; the centre-left inlet 24 (as shown) communicates with two flow resistor tubes 28 parallel with one another; the centre-right inlet 24 (as shown) communicates with three flow resistor tubes 30 parallel with one another; and the extreme right-hand inlet 24 communicates with four flow resistor tubes 32 and parallel with one another. The outlets of the flow resistor tubes 26, 28, 30 and 32 all communicate with a common outlet conduit 34.

Figure 4:
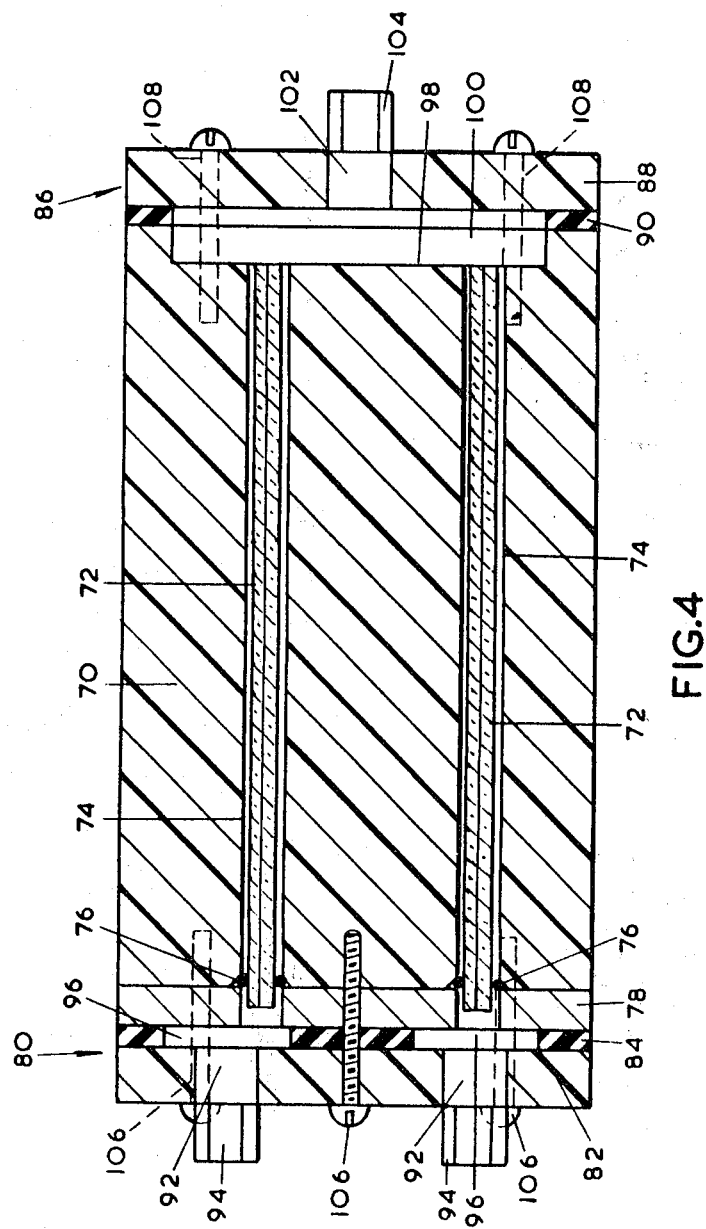
FIG. 4 is a longitudinal section through a flow restricting unit suitable for use in the apparatus shown in FIG. 1.
Figure 5:
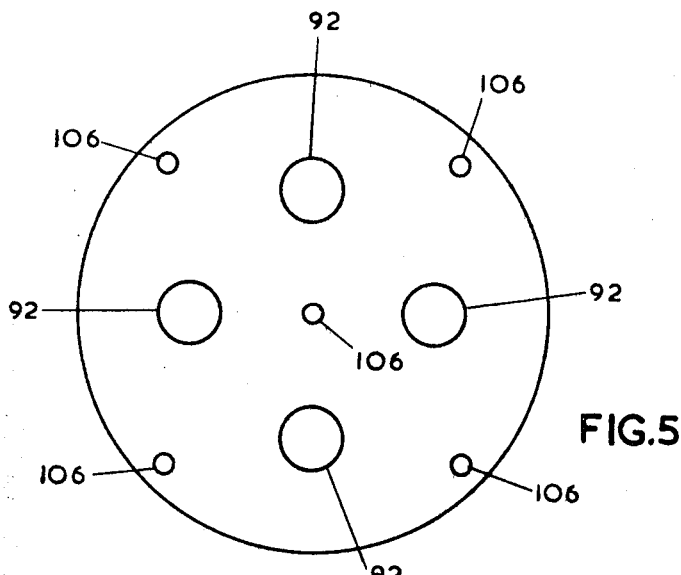
FIG. 5 is an end view of the unit shown in FIG. 4.
Figure 6:
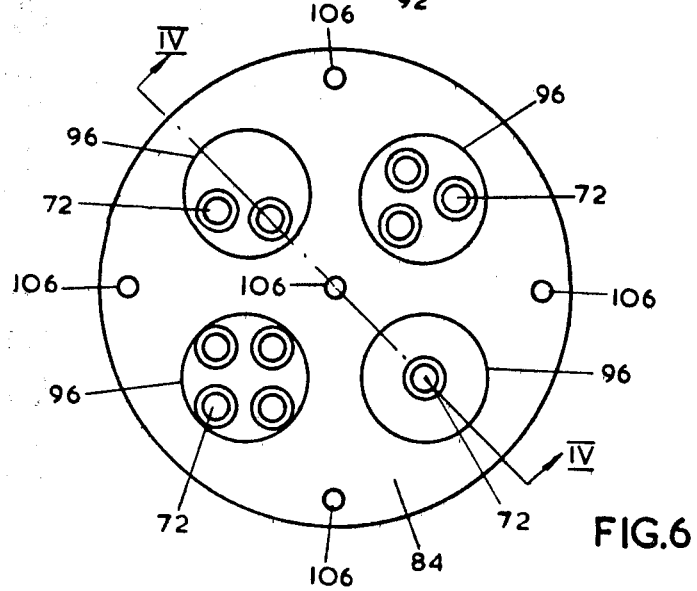
FIG. 6 is an end view of the unit shown in FIG. 4 with the inlet cap removed.

The construction of the flow resistance unit 5 is shown in FIGS. 4 to 6 of the accompanying drawings. The flow resistance unit 5 is cylindrical in shape. With reference to FIG. 4, it comprises a cylindrical solid body 70 which houses glass capillary flow resistance tubes 72 (each of which is open at both ends) in passages 74 extending from end to end of the body. Each passage 74 should preferably be of only slightly greater diameter than the capillary tube 72 it contains. This is so as to keep down the "dead" gas space within the body 70. There will in operation be a tendency for the gas trapped in this space to diffuse into the outlet 100 and mix with the gas leaving the capillary tubes. (Alternatively, or in addition, elastomeric O-rings may be employed to form seals between the capillaries and their respective passages at both ends of the body 70, and not just at the inlet end as shown. Another alternative is to have the O-ring seals 76 at the outlet ends of the capillary tubes 72 instead of at the inlet ends.) Around the inlet end of each capillary tube 72 is an elestomeric O-ring 76, each of which makes a seal between its capillary tube 72 and associated passage 74. The O-rings are held under a compressive force so as to make the seal fluid-tight. The compressive force is applied by a plate or other member of rigid construction, typically a metal sealing plate 78 which has apertures therein complementary to passages 74 formed in the body 70. Bolted, clamped or otherwise secured to the body 70 at its inlet end is an inlet header 80 comprising a gasket 84 of elastomeric material and a cap 82. Bolted, clamped or otherwise secured to the outlet end of the body 70 is an outlet header 86 comprising a cap 88 and a gasket 90. The inlet header 80 and the outlet 86 are disc-shaped members having the same diameter as the body 70.

As shown in FIG. 5, the cap 82 of the inlet header 80 has four axial passages 92 formed therethrough. Each passage 92 is of cylindrical bore and receives on its inlet side a connector 94 (FIG. 4) to which a gas conducting tube may be connected. Passages 92 have equal diameters and their centres all lie on the circumference of the same pitch circle whose centre lies on the axis of the cap 82.

With reference to FIGS. 4–6, the gasket 84 has four apertures 96 which are complementary to the passages 92 in the cap 82. The gasket 84 effects a seal between the header 82 and the body 70. It also effects the distribution of gas from the cap 82 to the capillary tubes 72. As shown in FIG. 6, the capillary tubes 72 (and hence the passages 74) are grouped together in a special way. Viewing the body from end on, its forward face may be viewed as consisting of four sectors each of 90° arc. In one segment, there is just one capillary tube 72. This corresponds to the flow resistor tube 26 indicated schematically in FIG. 1. In the next sector in the clockwise direction, there are four capillary tubes 72. These correspond to the flow resistance tubes 32 indicated schematically in FIG. 1. Continuing clockwise, there are just two capillary tubes in the next sector. These correspond to the flow resistance tubes 28 indicated schematically by reference numerals 28 in FIG. 1. Continuing in a clockwise direction, in the final sector there are three capillary tubes 72, these corresponding to the flow resistance tubes 30 in FIG. 1. As shown in FIG. 4, the plate 78 has apertures complementary to the capillary tubes 72 and their associated passages 74 (which extend axially through the body 70). Also, as shown in FIG. 4, the gasket 84 and body 70 are juxtaposed such that one of the passages 96 affords communication with the capillary tubes 72 in the first aforementioned sectors, but with no other capillary tube, another affords communication with the mouths of the four capillary tubes in the next sector in a clockwise direction, but with no other capillary tube; another affords communication with the mouths of the two capillary tubes in the next sector but with no other capillary tube, and the final passage 92 affords communication with the three capillary tubes in the final sector but with no other. The gasket 84 is of sufficient thickness to allow gas to pass unimpeded through the apertures 96 to the mouths of all the capillary tubes.

With reference to FIG. 4, the ends of the passages 74 remote from the inlet header 80 all come to and end in a recessed surface 98 of the body 70. The recessed surface 98 together with the outlet header 86 define a common chamber 100 corresponding to the passage 34 shown in FIG. 1. The gas leaving the respective capillary tubes 72 flows into this chamber 100 and thus mixing takes place. The gas then flows through a passage 102 coaxial with the axis of the cap 86 and thence through a stainless steel connector 104 which enables a tube or other gas conducting member to be fitted to the outlet header 86. The gasket 90 makes a seal between the chamber 100 and the outlet cap 86. The chamber 100 is large enough to allow free mixing of gas within it, and is typically 3 to 5 mm deep.

With reference to FIGS. 4 and 5, bolts or clamps 106 secure the cap 82, gasket 84 and plate 78 to the body 70 and provide the necessary pressure to ensure that the gasket 84 and the O-rings 76 are held under a pressure sufficient to effect a sealing engagement between respectively the cap 82 and the body 70 and the capillary tubes 72 and their associated passages 74. In order to help the latter seals, the mouths of the passages 74 are of frusto-conical shape so as to present surfaces against which the O-rings can be pressed.

With reference to FIG. 4, bolts or clamps 108 secure the cap 88 and gasket 90 to the body 70 and enable the gasket 90 to be held under a pressure sufficient for it to effect a seal between the cap 88 and the body 70.

Typically, the caps 82 and 88, and the body 70 are formed of a material such as graphite-filled PTFE (polytetrafluoroethylene). The gaskets 84 and 90 and the O-rings 76 are typically made of a synthetic elastomer which has good resistance to chemical attack. The sealing plate 78 and the connectors 94 and 104 are typically made of rigid corrosion-resistant material.

The glass capillary tubes 72 typically all have the same internal diameter (for example 0.1 mm or 0.2 mm) and are all substantially the same length (say 5 cm or 6 cm).

A considerable advantage of the apparatus illustrated in FIGS. 4 to 6 is that should it be desired to replace a capillary tube (which may, for example, have become blocked by a piece of dirt) then the flow restricting unit can readily be dismantled to permit access to be gained to the capillary tubes. This can be done simply by removing the bolts or clamps 106. It is a notable feature that the only means holding the capillary tubes in their passages are the O-rings seals at the inlet ends of the tubes. The capillary tubes 72 are not secured at their outlet ends.

Another advantage of the unit shown in FIG. 4, is that it can be made as a relatively small, and relatively light-weight item.

In operation of the apparatus, it is the arrangement of valves 3 as shown in FIG. 1 which enables the output from the regulators 6 and 8 to be applied to the gas passages of the inlet header 80.

Referring to FIG. 1, the inlet passage 2 communicates with a conduit 14 and the inlet passage 4 with a conduit 16. Connected in parallel with one another and all feeding from the conduit 14 are passages 18. Each passages 18 terminates in an inlet port of an associated valve 22. Connected in parallel with one another and all feeding from the conduit 16 are four passages 20, each of which terminates in an inlet port of an associated valve 22. There are four valves 22. Each valve has two inlet ports, one of which receives one of the passages 18, and the other of which receives one of the passages 20. Each valve 22 has a single outlet port communicating with one of the passages 24 which feed the flow resistor tubes. Each valve 22 is capable of operation so that it can put at any one time one of the passages 18 or one of the passages 20 into communication with one of the passages 24.

By appropriately selecting the position of each of the valves 22, selected flow resistor tubes may be placed in communication with an inlet passage 2 and other selected flow resistor tubes may be placed in communication with passage 4. For example, the flow resistor tubes 26 and 28 could be placed in communication with the passage 4, and the flow resistor tubes 30 and 32 be placed in communication with the passage 2 so as to give a gas mixture comprising 30% of the gas flowing through the passage 2 and 70% of the gas flowing through the passage 4 (the percentages being by volume). It can readily be appreciated that the composition of the mixture may be varied in steps of 10% from 100% of the gas flowing through the passage 2 and 0% of the gas flowing through the passage 4 to a 100% of the gas flowing through the passage 4 and 0% of the gas flowing through the passage 2.

The valves may typically be of the spool kind, and be operated manually (for example by push-button control). Alternatively, the valves 22 may be solenoid operated.

The final part of the gas mixing apparatus shown in FIG. 1 is the outlet 7. An outlet passage 36 which communicates with the common passage 34. In the outlet passage 36 is a needle valve 38 which may be operated to control the pressure at which the gas mixture is supplied. Upstream of the needle valve 38 is back-pressure regulator 39. The back-pressure regulator 39 may be set so as to maintain an appreciable pressure drop across the mixer.

The apparatus shown in FIG. 1 may be assembled from standard parts (apart from the flow restrictor unit shown in FIGS. 4 to 6, which is relatively simple to manufacture). Standard pressure regulators may be adapted for use in the apparatus according to the invention simply by removing the springs which bias their valve members in a valve opening direction. It may be desirable in some instances to reinforce the restaint imposed upon flexure of the diaphragms of the regulators so as to prevent the gas pressure from causing the diaphragms to burst. The tubing which is used to conduct the gas to the various different parts of the apparatus may typically be of polytetrafluoroethylene and of sufficient diameter to allow the free passage of gas without significant pressure drop. Typically, a diameter of from 4 to 5 mm is sufficient for flows up to 10 liters per minute. Regulators having stainless steel bodies and being fitted with corrosion resistant diaphragms, and stainless steel solenoid valves 22 may typically be used.

Should the apparatus be required to mix non-corrosive gases only, the materials such as brass, neoprene, aluminium and rigid PVC may be used in its construction.

The apparatus shown in FIGS. 1 to 6 is intended to be capable of producing a range of gas mixtures of different composition from one another. If it is desired to produce only one mixture of predetermined composition then the apparatus may be of simpler construction. Suppose, for example, it desired to produce a gas mixture consisting of 10% by volume of the gas supplied to the passage 2, and 90% by volume of the gas flowing through the passage 4. In such an example, the valves 22 would not be required: the passage 2 would simply be connected directly to the one of the passages 24 serving the flow restrictor 26, and each one of the passages 20 connected to a respective passage 24 so as to place the flow restrictors 28, 30 and 32 in communication with the inlet passage 4. With reference to FIGS. 4 to 6, there would be just two connectors 94 and hence just two passages 92. Moreover, the gasket 84 would have just two apertures 96 complementary with the passage 92. One of these apertures would conduct gas to one of the capillary tubes 72, and the other would conduct gas to the remaining nine capillary tubes 72.

Figure 7:
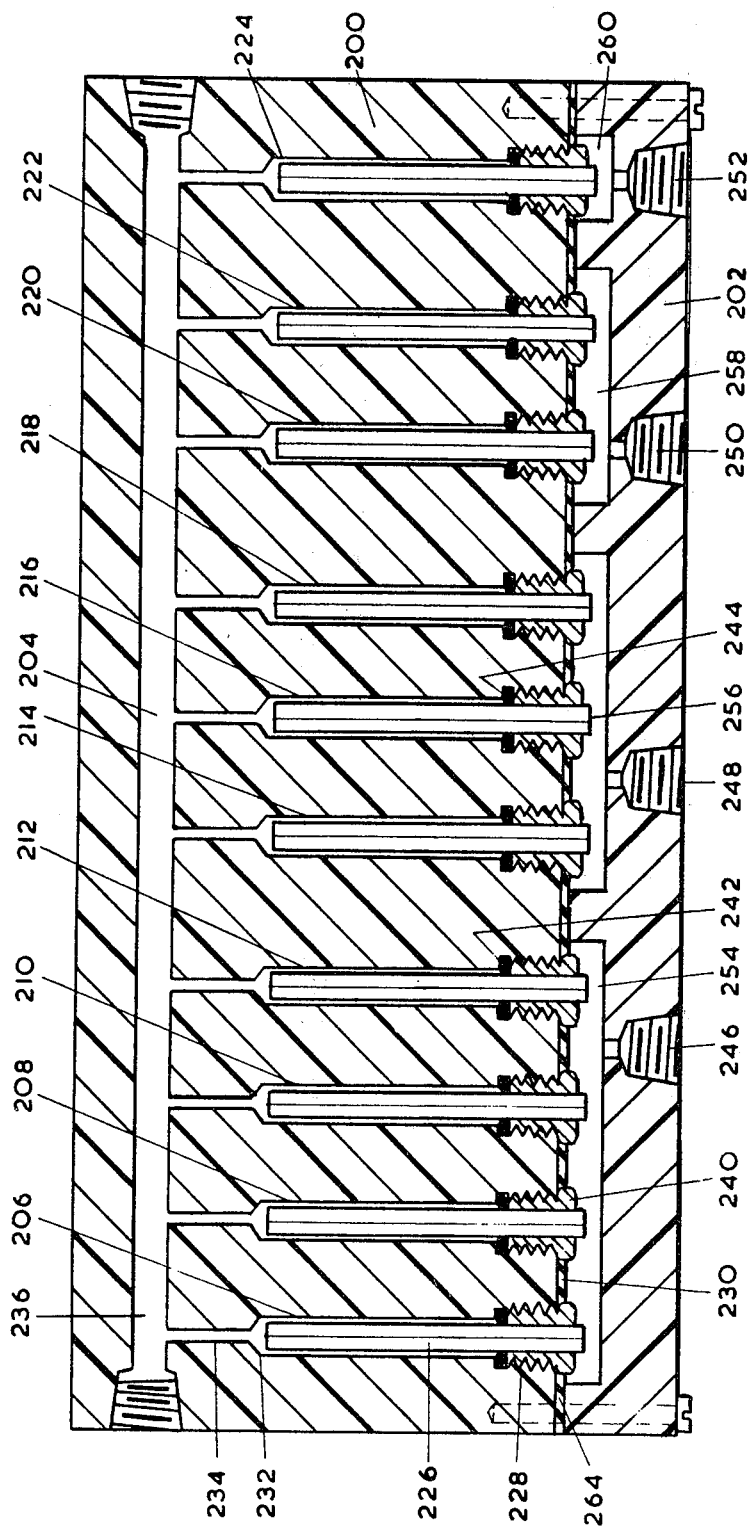
FIG. 7 is a schematic view, partly in section, of an alterntive flow restricting unit to that shown in FIGS. 4 to 6.

Instead of the flow restricting apparatus shown in FIGS. 4 to 6 of the accompanying drawings, that shown in FIG. 7 may be employed as part of the gas mixer schematically illustrated in FIG. 1.

With reference to FIG. 7 of the accompanying drawings, a gas flow restricting apparatus has a body 200 of solid plastics material, a demountable inlet header 202, and an outlet header 204 integral with the body 200. The body 200 is cuboid in shape. It has passages 206, 208, 210, 212, 214, 216, 218, 220, 222, and 224 which house glass capillary tubes 226. Each such passage has a relatively wide mouth 228 open to a face 230 of the body 200; an intermediate portion 232 of smaller diameter than the mouth, and an end portion 234 of smaller diameter than the intermediate portion 232. The portions 234 end in an outlet passage 236 whose axis extends at right-angles to those of the passages 206 to 224 the house the capillary tubes 226.

In the mouth 228 of each of the passages 206 to 224 is engaged a nut 240. Each nut 240 compresses an elastomeric O-ring sealing member 242 against a seat 244 defined by an annular surface forming part of the walls of its respective passage. Each sealing member 242 grips a respective capillary tube 226. The arrangement is such that each sealing member 242 is effective to prevent gas leaking between a capillary tube 226 and its respective passage.

The inlet header 202 is formed of plastics material. It has four inlets 246, 248, 250 and 252 which communicate with gas distribution chambers 254, 256, 258 and 260 respectively, the gas distribution chambers being formed in the header 202. Engaged between the header 202 and the face 230 of the body 200 is a gasket 264 which seals the chambers from one another. The chamber 254 affords communication between the inlet 246 and the capillary tubes in the passages 206, 208, 210 and 212; the chamber 256 affords communication between the inlet 248 and the capillary tubes in the passages 214, 216 and 218; the chamber 258 affords communication between the inlet 250 and the capillary tubes in the passages 220 and 222, and the chamber 260 affords communication between the inlet 252 and the capillary tube in the passage 224.

The inlet header 202 is demountably attached to the body 200 by, for example, bolts or clamps.

The outlet passage 236 may be open at both its end as shown in FIG. 7, and gas mixture may be taken from both these ends and, if desired, the two gas streams so formed may be combined. Alternatively, the outlet passage 236 may be open at just one of its ends only and gas mixture taken from this end.

The operation of the apparatus shown in FIG. 7 as part of the gas mixer illustrated schematically in FIG. 1 is analogous to that of the apparatus shown in FIGS. 4 to 6.

If it is desired to change the capillary tubes, th apparatus shown in FIG. 7 may be readily dismantled by removing the inlet header 200 and the nuts 240 (the nuts 240 typically make screw-threaded engagement with the respective mouths 228 of the passages 206 to 224) and the O-rings 242 removed from the capillary tubes and placed round new capillary tubes. The apparatus may then be reassembled. It will be appreciated that performing these operations does not require the breaking of any welded or brazed joint. The fluid-tight seals between the capillary tubes and their respective passages are effected simply by compressing elastomeric O-rings.

Since all the capillary tubes 226 are housed in a single body 200 of solid material the flow restricting apparatus may be relatively compact. Moreover, since the body 200 is cuboid in shape it can readily be housed in a cuboid casing with the other components of the mixer shown in FIG. 1.

Various changes in form and details may be made to the fluid mixer and fluid flow restricting apparatus without departing from the spirit and scope of the present invention. Consequently, it is intended that the appended claims be interpreted as including all such changes and modifications.

We claim:

1. For mixing fluids, fluid-flow restricting apparatus comprising a solid body having passages therethrough; elongate tubular flow restrictors housed in the passages; means for forming demountable fluid-tight seals between the restrictors and the passages; an inlet header having at least three fluid inlets for distributing fluid to the flow restrictors, and an outlet passage communicating with the outlet ends of the flow restrictors, the inlet header being demountably attached to the body.

2. Apparatus according to claim 1, in which the elongate flow restrictors are capillary tubes.

3. Apparatus according to claim 2, in which the capillary tubes are of glass.

4. Apparatus according to claim 2, in which each capillary tube carries an O-ring seal of elastomeric material which grips the outer wall of the tube and on compression makes a seal with the passage in which it is housed.

5. Fluid mixing apparatus comprising inlet conduits for the fluids to be mixed; a solid body having passages therethrough; elongate tubular flow restrictors housed in the passages; means for forming demountable fluid-tight seals between the restrictors and the passages; an inlet header communicating with the conduits for distributing fluid to the flow restrictors, the inlet header being demountably attached to the body; an outlet passage in the body communicating with the outlet ends of the flow restrictors; means for regulating the pressure at which each fluid is supplied to the elongate flow restrictors; valve means operable to place each inlet conduit in communication with selected flow restrictors, and an outlet conduit communicating with the outlet passage.

6. Fluid mixing apparatus according to claim 5, in which there is a backpressure regulator in the outlet conduit.

7. Fluid mixing apparatus according to claim 5, in which the elongate flow restrictors are capillary tubes.

8. Fluid mixing apparatus according to claim 7, in which the said means for regulating the pressure at which each fluid is supplied to the elongate flow restrictors comprises a pressure regulator in each inlet conduit and means for applying the output pressure of one pressure regulator to a valve member of another (or the other) pressure regulator in a valve-opening direction, whereby a change in the output pressure of said one pressure regulator produces a complementary change in the output pressure of said other regulator.

9. Fluid mixing apparatus according to claim 8, in which at least some of the pressure regulators includes a body having a fluid inlet and a fluid outlet; a valve member in communication with the fluid inlet; a valve seat; a plenum chamber downstream of the valve seat in communication with the fluid outlet; a biasing chamber to which a fluid pressure is able to be applied; and means for moving the valve member into and out of valve-closing engagement with the valve seat, said means for moving the valve member including a flexible diaphragm constituting a common wall between the plenum chamber and the biasing chamber.

10. Fluid mixing apparatus according to claim 7, in which each capillary tube carries an O-ring sealing member of elastomeric material which grips the outer wall of the said tube and on compression makes a seal with the passage in which it is housed.

11. For mixing fluids, fluid-flow restricting apparatus comprising a solid body having passages therethrough; elongate tubular flow restrictors housed in the passages; means for forming demountable fluid-tight seals between the restrictors and the passages; an inlet header having at least three fluid inlets for distributing fluid to the flow restrictors with each fluid inlet being in communication with a different number of flow restrictors from the other fluid inlets; and an outlet passage communicating with the outlet ends of the flow restrictors, the inlet header being demountably attached to the body.

12. For mixing fluids, fluid-flow restricting apparatus comprising a solid body having passages therethrough; elongate tubular flow restrictors housed in the passages; means for forming demountable fluid-tight seals between the restrictors and the passages; an inlet header having at least three fluid inlets for distributing fluid to the flow restrictors; and an outlet passage comprising a chamber formed in said solid body communicating with the outlet ends of the flow restrictors, the inlet header being demountably attached to the body.

* * * * *